United States Patent [19]

Hancock

[11] Patent Number: 5,057,731
[45] Date of Patent: Oct. 15, 1991

[54] SIMPLIFIED SPINDLE MOTOR FOR DISC DRIVE

[75] Inventor: Clyde J. Hancock, Fort Wayne, Ill.

[73] Assignee: Xolox Corportion, Fort Wayne, Ind.

[21] Appl. No.: 567,961

[22] Filed: Aug. 15, 1990

[51] Int. Cl.⁵ .................. H02K 1/00; H02K 3/18; H02K 19/26; H02K 1/12
[52] U.S. Cl. .................. 310/180; 310/193; 310/254; 310/261
[58] Field of Search .......... 310/49 R, 179, 180, 310/181, 184, 185, 187, 188, 193, 198, 208, 216, 254, 261

[56] References Cited

U.S. PATENT DOCUMENTS

| | | | |
|---|---|---|---|
| 3,978,356 | 8/1976 | Spiesberger | 310/49 R |
| 4,190,779 | 2/1980 | Schaeffer | 310/49 R |
| 4,315,171 | 2/1982 | Schaeffer | 310/49 R |
| 4,424,463 | 1/1984 | Musil | 310/49 R |
| 4,683,391 | 7/1987 | Higuchi | 310/49 R |
| 4,754,207 | 6/1988 | Heidelberg et al. | 310/198 |
| 4,758,752 | 7/1988 | Leenhouts | 310/198 |
| 4,774,428 | 9/1988 | Konecny | 310/198 |
| 4,833,355 | 5/1989 | Kawashima | 310/198 |
| 4,883,999 | 11/1989 | Hendershot | 310/179 |

FOREIGN PATENT DOCUMENTS 0853024  7/1949  Fed. Rep. of Germany ...... 310/179

Primary Examiner—Steven L. Stephan
Assistant Examiner—Clayton F. LaBalle
Attorney, Agent, or Firm—Barnes & Thornburg

[57] ABSTRACT

A dynamoelectric machine intended for use as a three-phase spindle motor in a computer disc drive. The motor includes a stator having nine poles, only six being provided with coils. A rotor has eight permanent magnet poles that coaxially surround in operative relation the nine poles. The six windings are connected to define three discrete electrical phases.

6 Claims, 3 Drawing Sheets

PRIOR ART

FIG. 4a

9 POLES

3 COILS PER PHASE
- 1 COIL/POLE
30 TURNS PER COIL
34 COPPER WIRE

| SLOT SYMBOLS | A | B | C | D | A THROUGH D |
|---|---|---|---|---|---|
| NUMBER OF CONDUCTORS | 30 | 30 | 30 | 30 | |
| NUMBER OF CONDUCTORS | | 30 | 30 | | |
| TOTAL CONDUCTORS/PHASE | 30 | 60 | 60 | 30 | 180 |
| TOTAL CONDUCTORS FOR 2 PHASES | | | | | 360 |

RESISTANCE PER 6 COILS = 4.48Ω*
INDUCTANCE PER 6 COILS = 0.498mh
BACK EMF AT 1800 RPM = 4.71vpp (PEAK TO PEAK)

INVENTION

FIG. 4b

9 POLES

2 COILS PER PHASE
- 2 COILS/3 POLES
45 TURNS PER COIL
34 COPPER WIRE

| SLOT SYMBOLS | A | B | C | D | A THROUGH D |
|---|---|---|---|---|---|
| NUMBER OF CONDUCTORS | 45 | 45 | 45 | 45 | |
| TOTAL CONDUCTORS/PHASE | 45 | 45 | 45 | 45 | 180 |
| TOTAL CONDUCTORS FOR 2 PHASES | | | | | 360 |

RESISTANCE PER 4 COILS = 4.58Ω*
INDUCTANCE PER 4 COILS = 0.527mh
BACK EMF AT 1800 RPM = 4.45vpp (PEAK TO PEAK)

*"R" INCLUDES LEAD LENGTH OF 12" X 2

SIMPLIFIED SPINDLE MOTOR FOR DISC DRIVE

BACKGROUND OF THE INVENTION

This invention relates to dynamoelectric machines and more particularly to improvements in spindle motors for disc drives.

It is common in three-phase spindle motors to have nine coil armatures (stators) connected in three discrete phases and eight pole permanent magnet rotors specifically arranged to minimize cogging torque and torque ripple. Examples of such motors are disclosed in Konecny U.S. Pat. No. 4,774,428 and Crapo U.S. Pat. No. 4,847,712. These utilize various winding patterns for realizing the stated advantages; however, they all require that all poles on the stator have coils; i.e., each pole have a coil such that a nine-pole stator has nine coils. In order to obtain opposite polarities on adjacent poles within a single phase, it has been necessary to wind the coils oppositely. Hence, the resulting structure has one coil for each pole (nine coils for nine poles) with adjacent coils being wound oppositely requiring at least two separate winding operations. Two-phase motors having auxiliary salient poles between wound poles are known, however.

SUMMARY OF THE INVENTION

It is an object of this invention to provide a three-phase spindle motor useful in a disc drive which is simpler in construction and to manufacture compared to prior art motors.

It is another object to provide a multi-phase rotor or stator for a spindle motor wherein the number of coils needed is less than the number of poles activated.

It is yet another object to provide in a multi-phase rotor or stator fewer coils than poles and wherein all of the coils in a given phase are wound in a common direction.

These and other objects of this invention are achieved in a disc drive spindle motor wherein the stator has nine poles, only six of which have coils thereon. The poles and coils are arranged and connected into a three-phase configuration, there being one set of poles and coils per phase. More specifically, each set has three circumferentially spaced poles with the opposite end poles being provided with coils wound in a common direction, leaving the intermediate pole with no coil thereon. The three sets are also arranged circumferentially with the adjacent poles of each set having coils thereon. The nine poles and the six coils are symmetrically arranged thereby to provide a nine-pole assembly.

In accordance with conventional design, a rotor is provided which includes an eight pole ring magnet thereby to realize minimum torque vibration as is well understood in the art. The resultant motor produces substantially the same performance parameters as a prior art, nine-pole, nine-coil motor of essentially the same physical size.

The foregoing and other objectives, features and advantages of the present invention will be more readily understood upon consideration of the following detailed description of the invention, taken in conjunction with the accompanying drawings.

BRIEF DESCRIPTION OF THE DRAWINGS

FIGS. 4a and 4b are charts used in explaining the features of this invention.

DETAILED DESCRIPTION OF THE INVENTION

Figure 1:
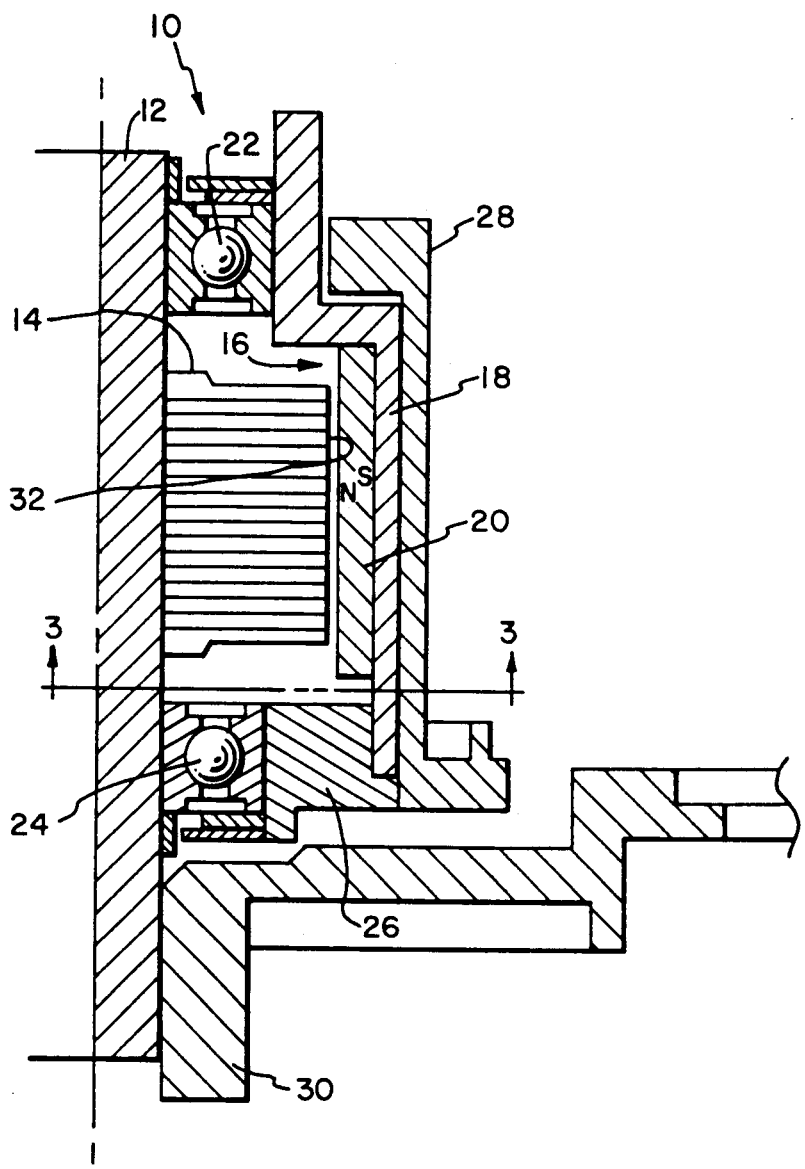
FIG. 1 is a partial, axial sectional view of a spindle motor incorporating the pole and coil arrangement of this invention.
Figure 2:
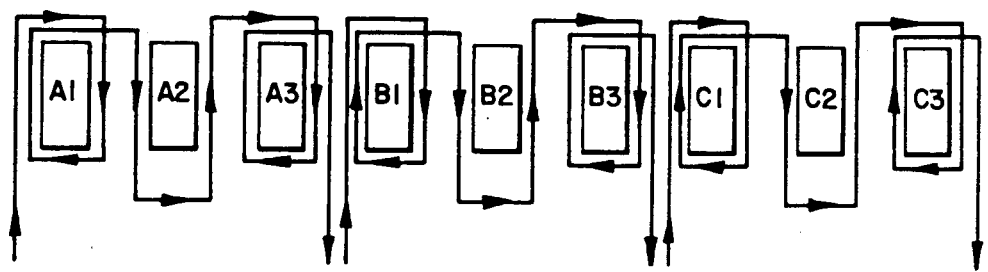
FIG. 2 is a schematic diagram of a winding pattern showing the poles that have coils thereon and those that do not.
Figure 3:
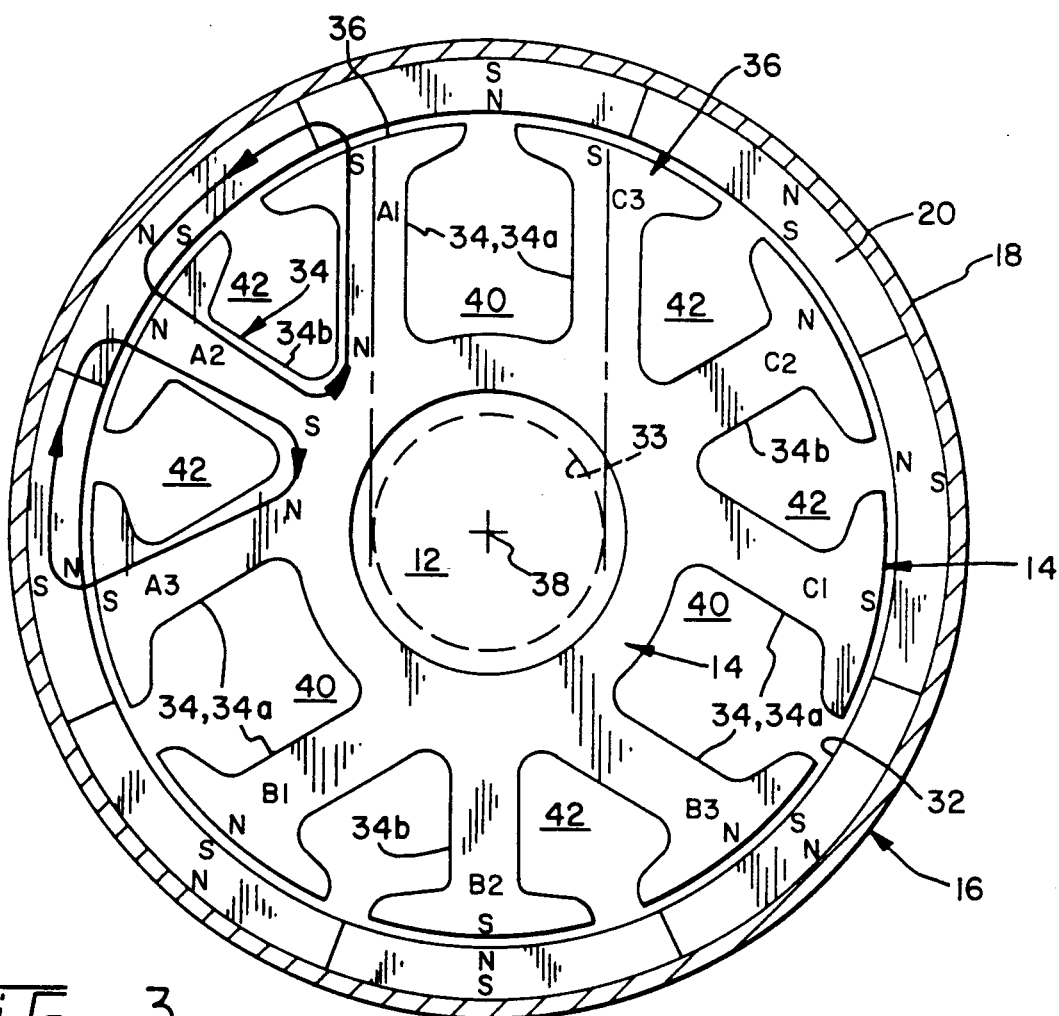
FIG. 3 is a cross-sectional view taken substantially along section line 3—3 of FIG. 1 and illustrates a lamination substantially to scale.

With reference to the drawings, and more particularly to FIGS. 1 and 2, the three-phase spindle motor generally indicated by the reference numeral 10, which is suitable for a computer disc drive, has a stator assembly which includes a steel shaft 12, and a stack 14 of ferromagnetic, such as steel, laminations and which provides nine outwardly extending poles on a common core as shown in FIG. 3. An external permanent magnet rotor assembly 16 includes a tubular rotor or flux return ring 18 of steel on the inner surface of which is mounted an annular series of radially magnetized permanent magnet poles 20 of some suitable magnet material such as neodymium, rare earth cobalt, or the like. There are eight such poles 20 arcuately shaped each extending over an angle of 45°, a conventional arrangement for spindle motors.

A flux return ring 18 is journalled on the shaft 12 by means of a suitable bearing 22 and another bearing 24 mounts for rotation a bearing ring 26, also of steel, which is suitably secured to the lower end of the flux return ring 18 by some suitable means such as bonding or press-fitting. Coaxially secured to the outer periphery of the flux return ring 18 is a disc-carrying hub 28 of tubular form. A base element 30 is secured to the lower end of the shaft 12 as shown.

By reason of the mounting bearings 22 and 24, the rotor assembly 16 which includes the components 18, 20 and 28 are free to rotate about the shaft 12 and also the stack 14 of stator laminations. An air gap 32 is provided between the stator and rotor assemblies as shown.

In this three-phase motor, the respective locations of the three phases are indicated in FIG. 3 by the three sets of three poles each so arranged that the arcuate pole tips 36 are evenly circumferentially spaced. One of the phases is indicated by the poles A1, A2 and A3, a second phase by the symbols B1, B2 and B3, and the third phase by the symbols C1, C2 and C3. As is obvious from viewing FIG. 3, the poles are not identically shaped, the poles A2, B2 and C2 extending substantially radially while the poles A1, A3, B1, B3, C1, C3 extend substantially tangentially to an imaginary circle 33 which is concentric with respect to the shaft 12. More specifically, each pole consists of a post 34 and a tip 36, the post 34 being of uniform thickness between its inner and outer extremities and extending longitudinally substantially parallel to the axis 38 of the shaft 12. The tip 36 is conventional in shape, being arcuate and coincident with a circle concentric about the axis 38. The tips 36 of all of the poles have arcuate lengths which are as long as possible to the point of allowing just enough clearance for winding the coils around the posts 34. Comparing the tips 36 with prior art motors, it will be noted that the arcuate extents thereof are essentially the same, and that the primary difference in the pole design lies in the outwardly protruding portions of the post 34, 34a being tangential relative to the axis 38 and shaft 12 more than radial. By comparison, the posts 34b of the poles A2, B2, and C2 protrude radially from the center 38 as shown.

Figure 4:
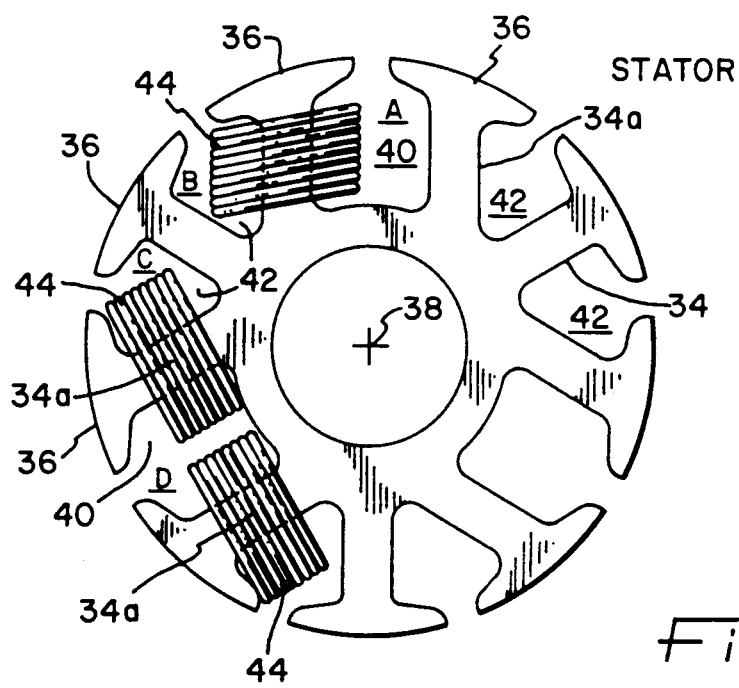
FIG. 4 is a fragmentary end view of the stator for use in explaining the coil arrangement and also for providing reference symbols used in the charts of FIGS. 4a and 4b.

The slots in the stator are of two different sizes, those indicated by the numeral 40 between posts 34a being larger than the slots 42 on opposite sides of the posts 34b. This is made possible by reason of the tangential geometry of the posts 34a. The reason for this difference in slot size is to provide space for the coils to be wound on the posts 34a. As shown in FIG. 4, coils 44 wound on adjacent posts 34a occupy the respective slots 40 therebetween with the slots 42 being occupied by the coils on the post 34a adjacent thereto. Since there are two coils within each slot 40, and only one in the slot 42, the slots 40 need to be larger in order to accommodate the number of turns required in the coils. Thus, in the geometry making up the laminations for the stator 14, it has been found that the disparity in slot sizes can be simply obtained by making the posts 34a substantially tangential with respect to the stator center 38 instead of radial.

A comparison of typical parameters as between a prior art nine-pole, nine-coil motor and a nine-pole, six-coil motor of essentially the same physical size is graphically shown in FIGS. 4a and 4b. The chart of FIG. 4a for the prior art motor has slots denoted by the symbols A, B, C and D which are all of the same size. As shown in FIG. 4b, the slots A, B, C and D of the motor of this invention are of different size, slots A and D being larger than slots B and C. Referring again to FIG. 4a, it is assumed that 30-turn coils are wound around each pole. This results, considering only a single phase of a three-phase arrangement, in the number of conductors shown existing in each of the related slots. For two phases, the total number of conductors will be as shown which is 360.

By comparison, and referring to FIG. 4b, assuming that the coils have 45 turns, the number of conductors in each of the slots A, B, C and D are as shown. The total number of conductors for two phases is 360, the same as for the conventional arrangement of FIG. 4a. It will be noted that as to the electrical parameters, the coil resistance for the two phases in the prior art arrangement is slightly less than that for the invention. The inductance in the prior art arrangement is slightly less. Also, the back EMF is slightly higher for the prior art arrangement. In order to increase the back EMF in the example of FIG. 4b, it is only necessary to add two more turns to the coils making the total number of turns per coil 47 instead of 45. These charts of FIGS. 4a and 4b are given for the purpose of illustrating that performance for the simpler six-coil arrangement is essentially the same as that for the nine-coil motor.

As shown in FIG. 2, which is a schematic winding pattern of the respective stator poles developed into a flat plane, a winding pattern for each of the three phases is as shown with coils for the first phase being around poles A1 and A3 only, those for the second phase being on the poles B1 and B3, and those for the third phase being on the poles C1 and C3. The winding pattern indicates that the coils are all wound in the same direction. Thus, the needle of the winding machine used to wind the individual coils needs to rotate in only one direction. A single needle machine would thus have to index six times in winding all the coils rather than nine times as would be the minimum number required in winding the prior art stators. If a winding machine having three needles is used, then three coils can be wound simultaneously and only one indexing would be required in order to wind the second set of three.

A conventional nine-pole stator having same sized slots could be wound with two coils per phase; however, the relatively small space between poles limits the coil design either as to wire size or number of turns. In order to obtain a maximum number of turns per pole, the wire size must be relatively small thereby producing a relatively high ohmic resistance per coil.

By rearranging pole design as is achieved in the present invention to provide more coil space between phases; i.e., more coil space at locations spaced 120° apart, essentially the same number of conductors per slot may be realized as well as the same resistance, inductance and back EMF as in the nine-pole, one coil per pole design. In operation, the direction of the current through the respective coils depends on the commutation as is well known to those skilled in the art.

Among the advantages of the present invention is the achievement of two coils per phase instead of three, the total number of conductors in the various slots of the stator being essentially the same as for the nine-pole, nine-coil arrangement, and all coils being wound in the same direction.

While there have been described above the principles of this invention in connection with a specific device, it is to be clearly understood that description is made only by way of example and not as limitation to the scope of the invention.

What is claimed is:

1. For use in a three-phase dynamoelectric machine, a rotor or stator comprising a plurality of circularly arranged magnetic poles on a common ferromagnetic core and separated by slots, the number of poles and slots being nine, said poles and slots being further arranged into three discrete sets of three adjacent poles and slots corresponding to three electric phases, respectively, the slots between sets being larger than the slots within the sets, the adjacent poles of adjacent sets having coils thereon, the intermediate pole of each set having no coil thereon, said larger slots of adjacent sets thereby receiving the conductors of two coils, the slots within said sets thereby receiving the conductors of only single coils, respectively, and said poles having tips which are evenly circumferentially spaced.

2. The rotor or stator of claim 1 wherein all coils are wound in the same direction.

3. The rotor or stator of claim 1 wherein, the two opposite end poles of each set have the coils thereon connected in series to constitute one phase.

4. The rotor or stator of claim 3 wherein the adjacent poles of adjacent sets are generally aligned parallel and tangentially to an imaginary circle concentric with the circular pole arrangement, said poles that have no coil being aligned generally radially of said imaginary circle.

5. The rotor or stator of claim 4 wherein said larger slots are generally orthogonal in cross-section and said smaller slots are generally triangular.

6. The rotor or stator of claim 1 wherein the other of said rotor or stator includes a permanent magnet array having a plurality of magnetic poles circularly arranged, means coaxially mounting said rotor and stator for relative rotation, the number of permanent magnetic poles being one more or one less than the number of ferromagnetic poles.

* * * * *